United States Patent
Weiss et al.

(10) Patent No.: US 6,597,194 B2
(45) Date of Patent: Jul. 22, 2003

(54) DIFFERENCE FREQUENCY IMAGING AND SPECTROSCOPY TO MEASURE DOPANTS USING AN ALTERNATING CURRENT SCANNING TUNNELING MICROSCOPE

(75) Inventors: Paul S. Weiss, State College, PA (US); Gregory S. McCarty, State College, PA (US)

(73) Assignees: The Penn State Research Foundation, University Park, PA (US); Atolytics, Inc., State College, PA (US)

( * ) Notice: Subject to any disclaimer, the term of this patent is extended or adjusted under 35 U.S.C. 154(b) by 13 days.

(21) Appl. No.: 09/882,967

(22) Filed: Jun. 15, 2001

(65) Prior Publication Data

US 2002/0033708 A1 Mar. 21, 2002

Related U.S. Application Data

(60) Provisional application No. 60/211,592, filed on Jun. 15, 2000.

(51) Int. Cl.[7] ............................................... G01R 31/26
(52) U.S. Cl. .................... 324/765; 324/763; 324/764
(58) Field of Search ............................. 324/158.1, 758, 324/763, 764, 765, 23.1, 759, 527, 750, 755, 528; 438/14; 269/22; 365/201

(56) References Cited

U.S. PATENT DOCUMENTS

| | | | | |
|---|---|---|---|---|
| 3,952,203 A | * | 4/1976 | Hoppe | 250/442 |
| 4,325,025 A | * | 4/1982 | Corcoran et al. | 324/158.1 |
| 5,268,573 A | | 12/1993 | Weiss et al. | 250/306 |
| 5,281,814 A | | 1/1994 | Weiss et al. | 250/306 |
| 5,559,328 A | | 9/1996 | Weiss et al. | 250/306 |
| 5,581,193 A | | 12/1996 | Weiss et al. | 324/750 |
| 5,661,301 A | | 8/1997 | Weiss | 250/307 |

OTHER PUBLICATIONS

"Capacitance–voltage Measurement and Modeling on a Nanometer Scale by Scanning C–V Microscopy," Y. Huang et al., *Journal of Vacuum Science and Technology*, B 12, 1994, pp. 369–372.

"Quantitative Two–dimensional Dopant Profile Measurement and Inverse Modeling by Scanning Capacitance Microscopy," Y. Huang et al., *Applied Physics Letters 66*, 1995, pp. 369–371.

(List continued on next page.)

*Primary Examiner*—Ernest Karlsen
*Assistant Examiner*—Trung Nguyen
(74) *Attorney, Agent, or Firm*—Parsons Hsue & De Runtz LLP

(57) ABSTRACT

A tunable high frequency AC scanning tunneling microscope (ACSTM) has been utilized to image and to record spectra for semiconductor characterization. A difference frequency mixing technique sensitive to dopant type and concentration is applied both to uniformly doped and to patterned semiconductor substrates. Uniformly doped silicon substrates were used to characterize the difference frequency spectral signature for both p- and n-type Si. Comparison of the measured difference frequency to such signature can be used for distinguishing between the two types of dopants in samples with unknown dopant type. Patterned substrates were then fabricated, and a spectroscopic imaging mode was used to map out dopant density at ultrahigh resolution, and to distinguish between areas of different concentration and different dopant type. By measuring samples of known dopant dosages to form a reference database, the unknown dosage of the same dopant in a portion of a sample may be found by comparing the difference signal measured from the sample to the reference database.

28 Claims, 7 Drawing Sheets

OTHER PUBLICATIONS

"Scanning Capacitance Microscopy and Spectroscopy Applied to Local Charge Modifications and Characterization of Nitride–oxide–silicon Heterostructures," M. Dreyer, R. Wiesendanger, *Applied Physics* A 61, 1995, pp. 357–362.

"Scanning Capacitance Microscopy Measurements and Modeling: Progress Towards Dopant Profiling of Silicon," J.J. Koanski et al., *Journal of Vacuum Science and Technology* B 14(1), Jan./Feb. 1996, pp. 242–247.

"Contrast Reversal in Scanning Capacitance Microscopy Imaging," R. Stephenson et al., *Applied Physics Letters*, vol. 73, No. 18, 1998, pp. 2597–2599.

"Scanning Capacitance Microscope Methodology for Quantitive Analysis of p–n Junctrions," V.V. Zavyalov et al., *Journal of Applied Physics*, vol. 85, No. 11, 1999, pp. 7774–7783.

"pn–junction Delineation in Si Devices Using Scanning Capacitance Spectroscopy," H. Edwards et al., *Journal of Applied Physics*, vol. 87, No. 3, 2000, pp. 1485–1495.

"Microwave–mixing Scanning Capacitance Microscopy of pn Junctions," J. Schmidt et al., *Journal of Applied Physics*, vol. 86, No. 12, 1999, pp. 7094–7099.

"Difference Frequency Imaging and Spectroscopy to Profile Dopants Using the Alternating Current Scanning Tunneling Microscope," Z.J. Donhauser et al., Proceedings of the 2001 International Conference on Ultrashallow Junctions, *American Institute of Physics*, New York, 2001, 7 pages.

"High Resolution Dopant Profiling Using a Tunable AC Scanning Tunneling Microscope," Z.J. Donhauser et al., *Proceedings of the 2000 International Conference on Characterization and Metrology for ULSI Technology*, 2000, pp. 1–6.

* cited by examiner

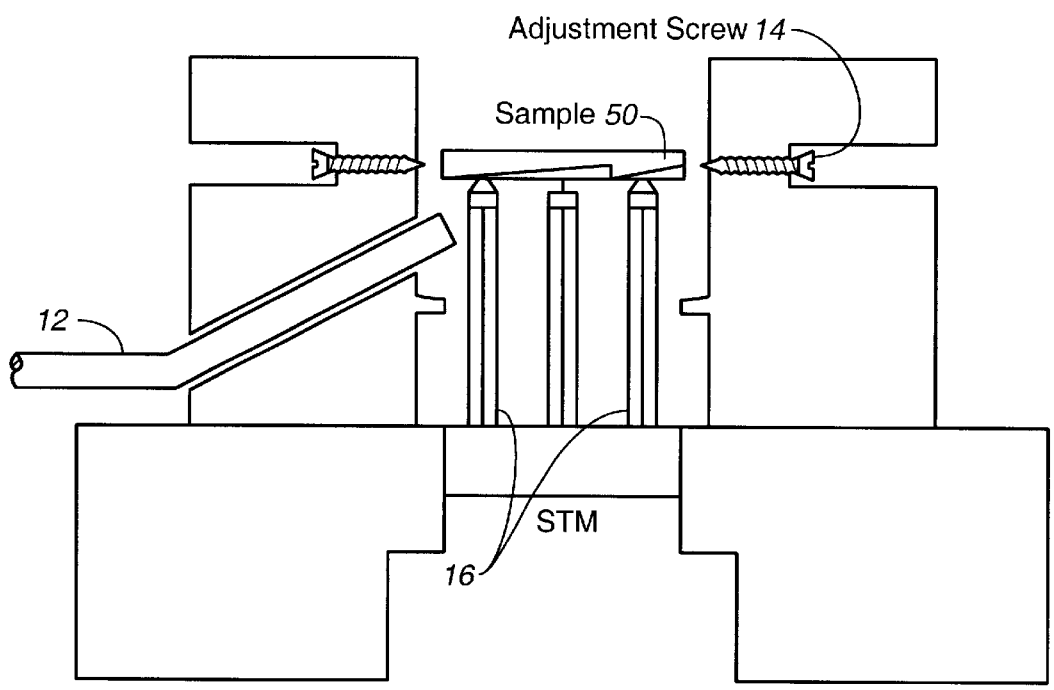
FIG._1
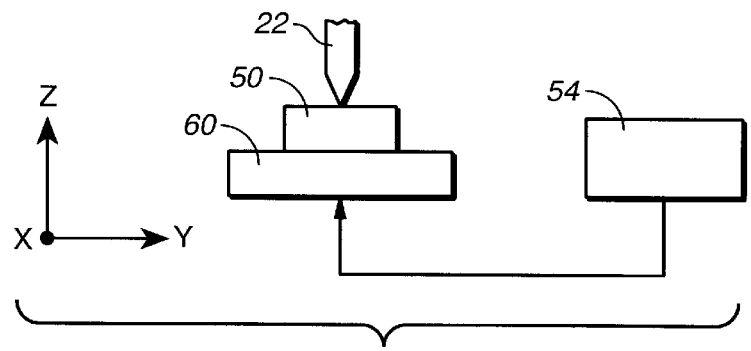
FIG._2B

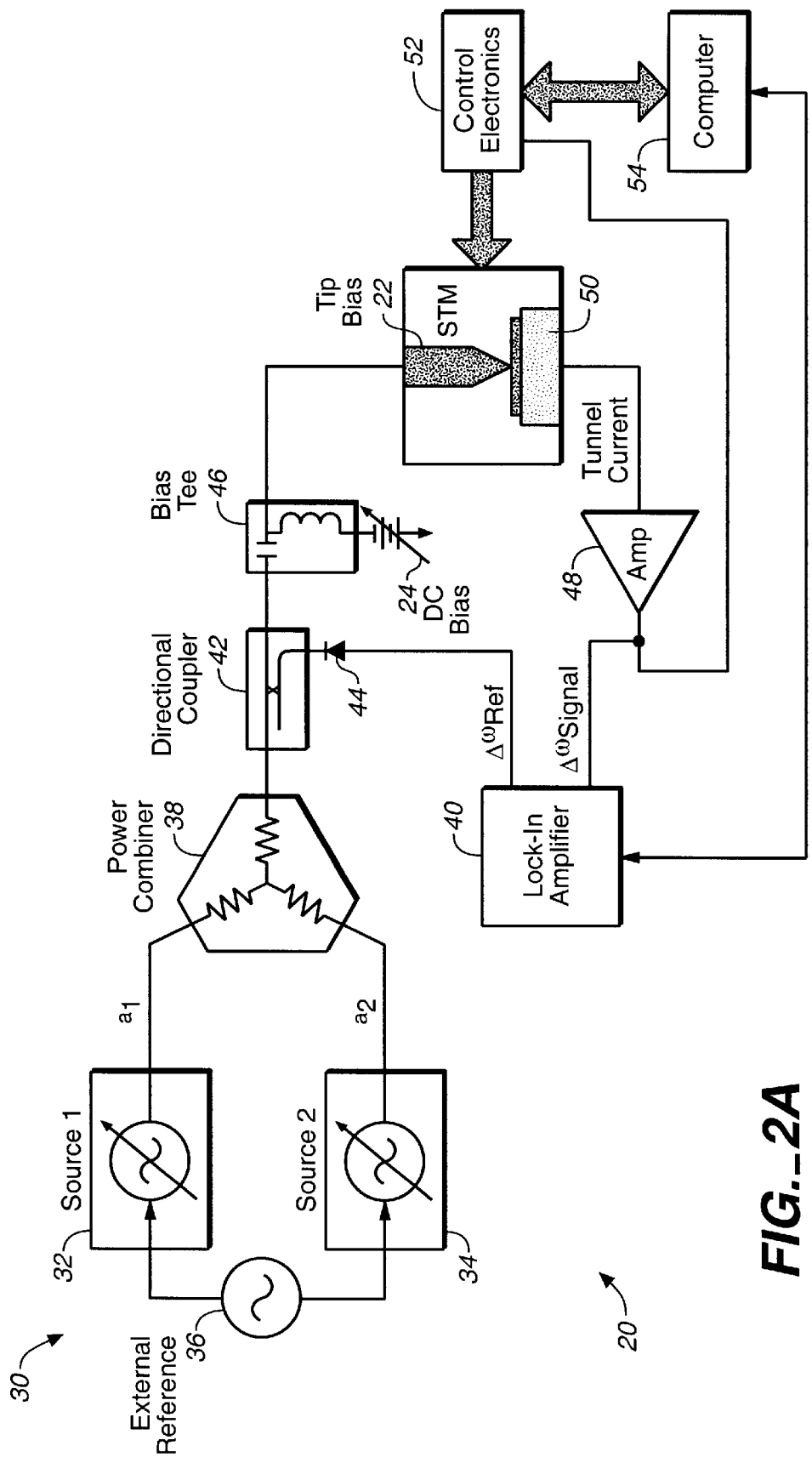
FIG._2A

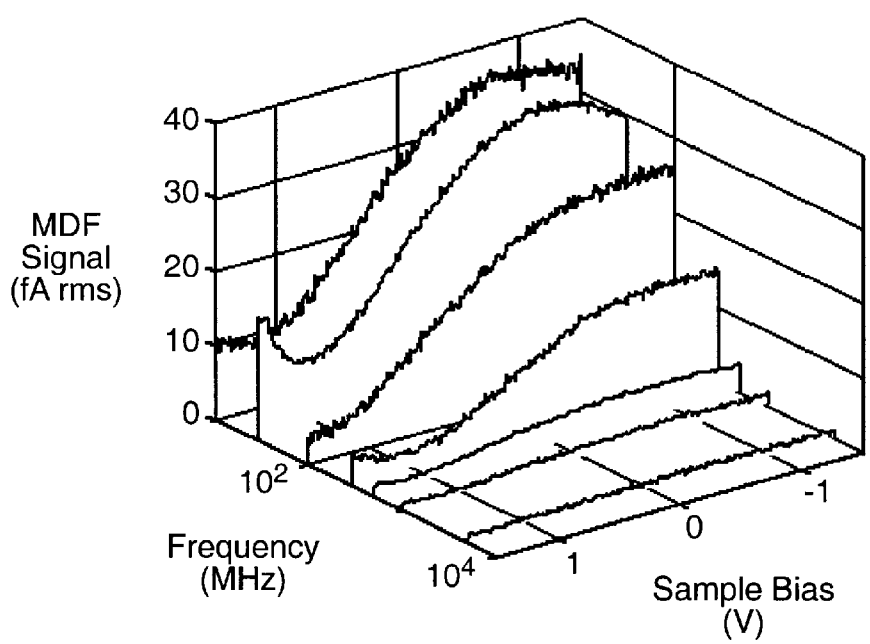
FIG._3A
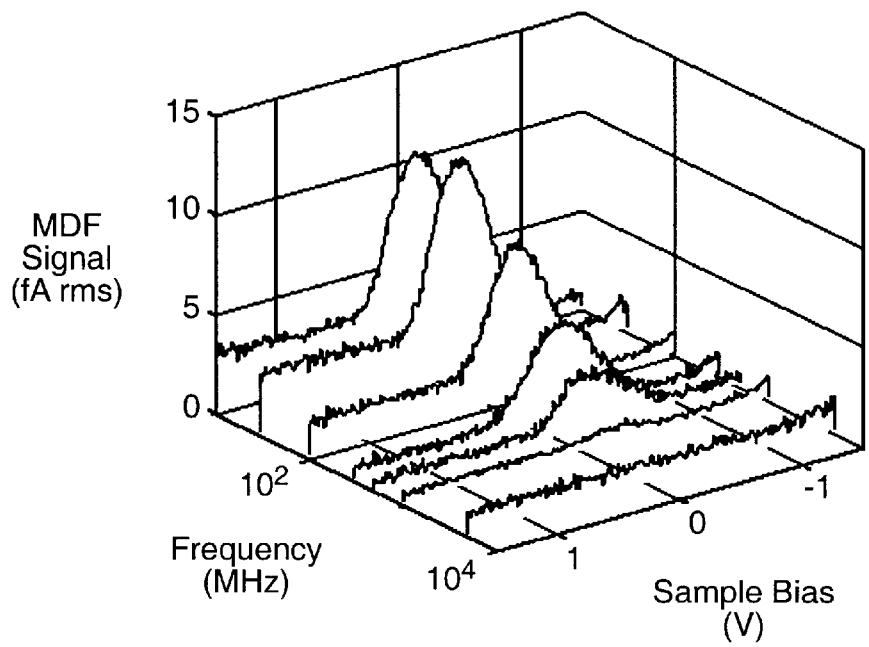
FIG._3B

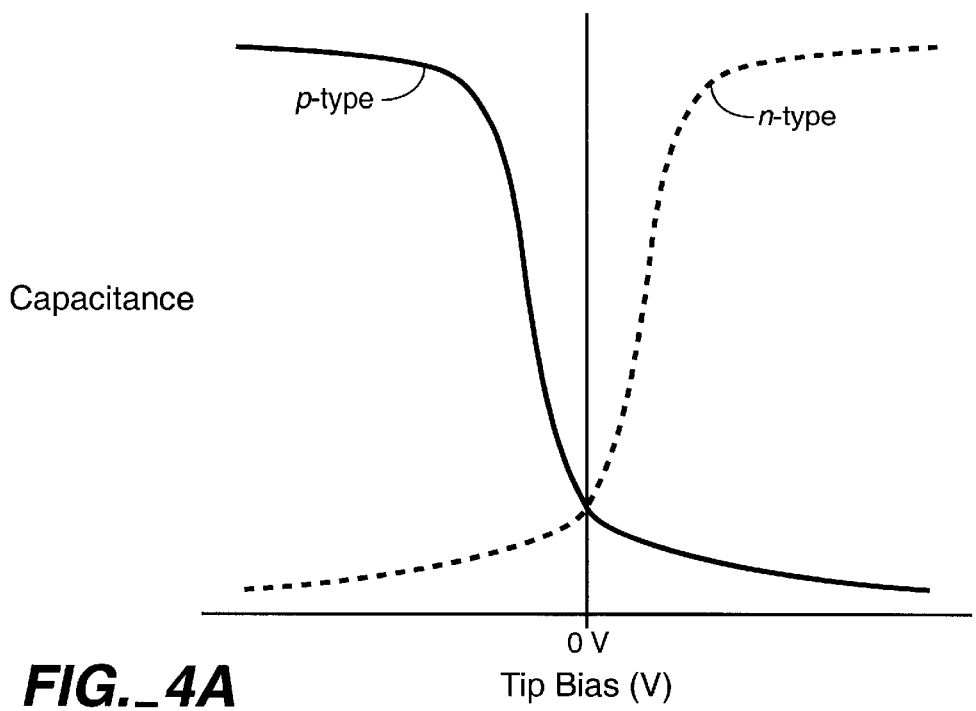
FIG._4A
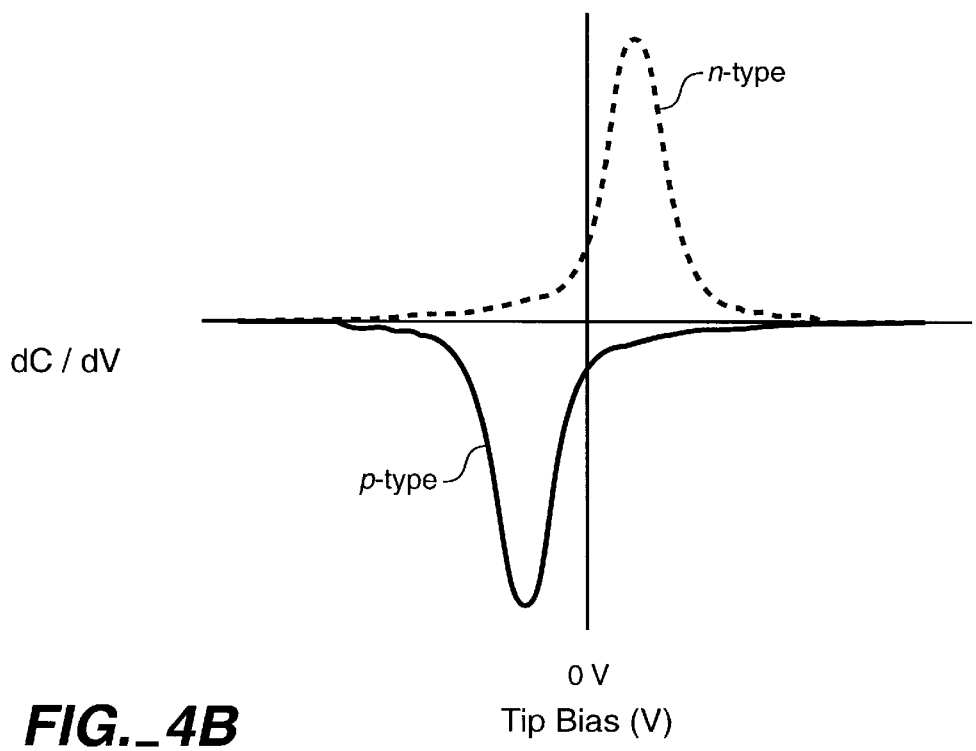
FIG._4B

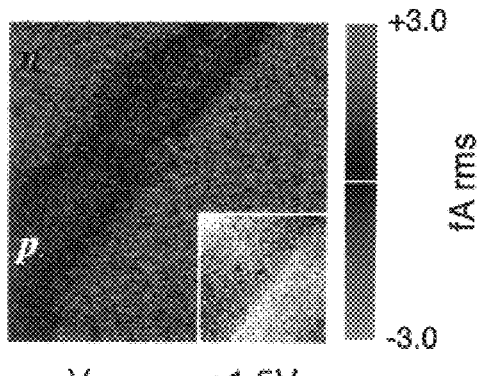
FIG._5A
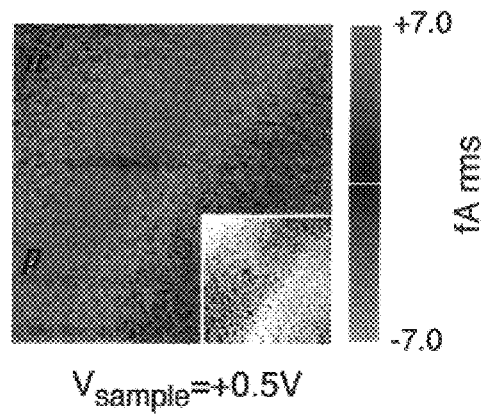
FIG._5B
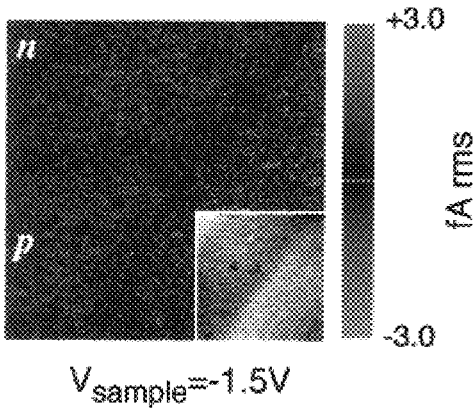
FIG._5C
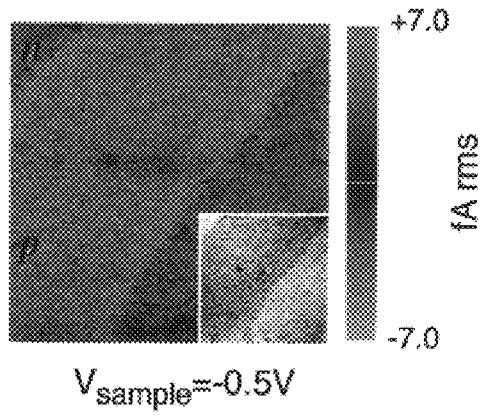
FIG._5D
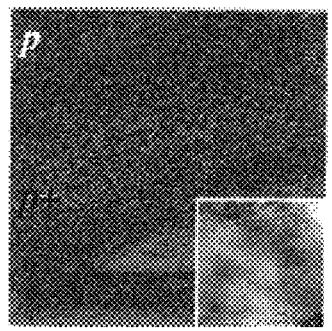
FIG._6

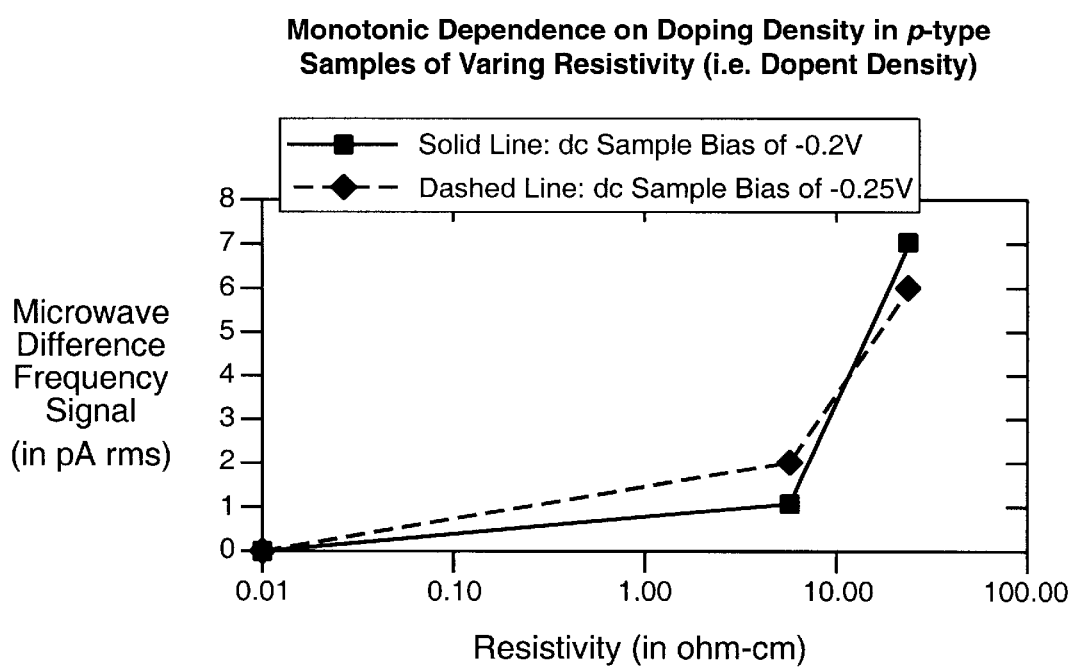
FIG._7

Defects and Vacancies in MoS$_2$

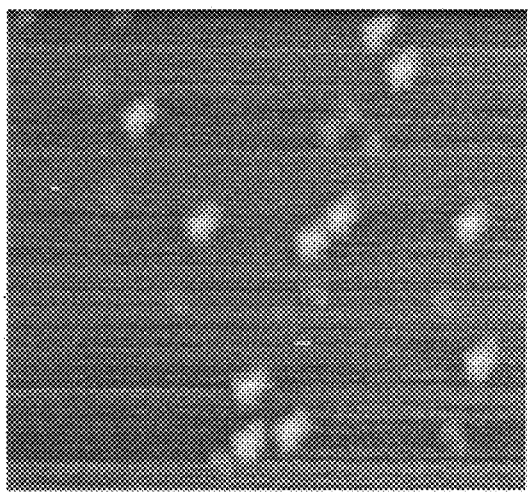

Topography

1000 Å x 1000 Å of MoS$_2$
$V_{sample}$ = -0.5 V, I = 1 pA
f = 10.000000, 10.00500 MHz Single Atomic Vacancies Function as Dopants and can be Located Via with Microwave Difference Frequency Imaging.

FIG._8A

Defects and Vacancies in MoS$_2$

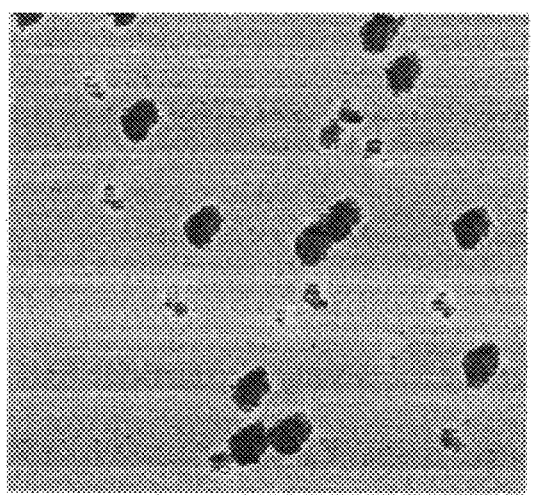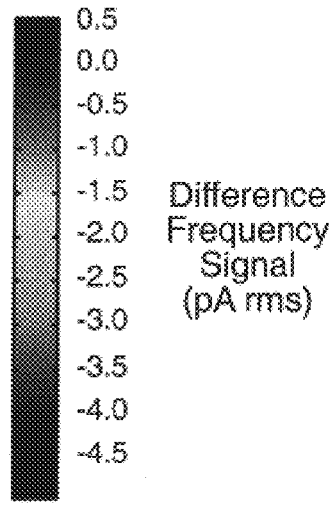

Difference Frequency

1000 Å x 1000 Å of MoS$_2$
$V_{sample}$ = -0.5 V, I = 1 pA
f = 10.000000, 10.00500 MHz Single Atomic Vacancies Function as Dopants and can be Located Via with Microwave Difference Frequency Imaging.

FIG._8B

DIFFERENCE FREQUENCY IMAGING AND SPECTROSCOPY TO MEASURE DOPANTS USING AN ALTERNATING CURRENT SCANNING TUNNELING MICROSCOPE

This application claims benefit of Prov. No. 60/211,592 filed Jun. 15, 2000.

This work was supported by the US Department of Commerce/NOAA Contract #50DKNB990085; the government has rights to the invention in this application.

BACKGROUND OF THE INVENTION

This invention relates in general to systems for measuring dopants, and in particular a system using difference frequency imaging and spectroscopy to measure dopants or other atomic characteristics using an alternating current scanning tunneling microscope ("ACSTM").

Scanning probe microscopes are extremely important for characterizing semiconductors with very high spatial resolution. According to the 1999 International Technology Roadmap for Semiconductors (1), there was already an unmet critical need to be able to determine 2-D dopant profiles with 3 nm resolution in 1999, and 1 nm spatial resolution will be needed by 2008. Much of the recent work in this field has focused on the development of the scanning capacitance microscope (SCM). See, for example:

(1) Capacitance-Voltage Measurement and Modeling on a Nanometer Scale by Scanning C-V Microscopy, by Y Huang and C. C. Williams; Journal of Vacuum Science and Technology B 12, 369 (1994)

(2) Quantitative Two-Dimensional Dopant Profile Measurement and Inverse Modeling by Scanning Capacitance Microscopy by Y Huang, C. C. Williams, and J. Slinkman; Applied Physics Letters 66, 344 (1995)

(3) Scanning Capacitance Microscopy and Spectroscopy Applied to Local Charge Modifications and Characterization of Nitride-Oxide-Silicon Heterostructures by M. Dreyer and R. Wiesendanger; Applied Physics A 61, 357 (1995)

(4) Scanning Capacitance Microscopy Measurements and Modeling: Progress Towards Dopant Profiling of Silicon, by J. J. Kopanski, J. F. Marchiando, and J. R. Lowney; Journal of Vacuum Science and Technology B 14, 242 (1996)

(5) Contrast Reversal in Scanning Capacitance Microscopy Imaging, by R. Stephenson, A. Verhulst, P. DeWolf, M. Caymax, and W. Vandervorst; Applied Physics Letters 73, 2597 (1998)

(6) Scanning Capacitance Microscope Methodology for Quantitative Analysis of p-n Junctions, by V. V. Zavyalov, J. S. McMurray, and C. C. Williams; Journal of Applied Physics 85, 7774 (1999)

(7) pn-Junction Delineation in Si Devices Using Scanning Capacitance Spectroscopy, by H. Edwards, V. A. Ukraintsev, R. San Martin, F. S. Johnson, P. Menz, S. Walsh, S. Ashburn, K. S. Wills, K. Harvey, and M. -C. Chang; Journal of Applied Physics 87, 1485 (2000)

These instruments have shown high sensitivity towards dopant density and type, and have accurately imaged devices on semiconductor surfaces with resolution as high as 10 nm. However, the lateral resolution when using capacitance detection is limited by the probe tip geometry and dopant level. Improving spatial resolution requires the development of new scanning probe techniques.

As one type of scanning capacitance microscope, a two-frequency mixing strategy designed to image p-n junctions using a microwave frequency compatible atomic force microscope (AFM) has been reported by J. Schmidt, D. H. Rapoport, G. Behme, and H. -J. Frohlich, J. Appl. Phys., 86, 7094 (1999). These particular AFM experiments used the sum and third harmonic frequencies as nonlinear mixing product signals. It was found that the sum frequency signal and the third harmonic signal are proportional to dC/dV and $d^2C/dV^2$, respectively, where C is the capacitance and V the voltage across the AFM tip and the sample.

None of the above systems is entirely satisfactory. It is therefore desirable to provide an instrument for measuring dopants with improved capabilities.

SUMMARY OF THE INVENTION

This invention is based on the observation that the above-described mixing strategy reported by J. Schmidt referenced above can be improved as follows. By measuring at a frequency substantially equal to the difference between the frequencies of two alternating current (AC) signals, or a multiple thereof, applied to a doped semiconductor material, it is possible for dopants to be detected at a much lower frequency than the frequencies of the AC signals applied. As used here-in-below, the term "difference frequency" refers to the difference between the frequencies of two alternating current (AC) signals, or a multiple thereof. This has the advantage of detecting signals at frequencies much below the microwave range so that the detection instrument can be much simplified compared to that employed by J. Schmidt referenced above.

Applicants discovered that the signal measured at the difference frequency depends upon the magnitude of the direct current (DC) bias voltage applied between the STM tip and the sample. Thus, preferably, the DC bias voltage is varied to optimize the difference frequency signal that is to be detected before the sample is measured at such DC bias voltage. For some applications, this means tuning the DC bias voltage until the amplitude of the difference frequency signals is at a maximum. For other applications, this may mean tuning the DC bias voltage until the best contrast is achieved between the measurement of two types of dopants. Still other optimization schemes are possible.

Applicants recognized that the difference frequency signal also depends upon the frequencies of the two or more AC signals applied to the sample. In other words, such amplitudes can be optimized by tuning the frequencies of the two or more AC signals applied to the sample. Therefore, preferably, the frequencies of the two or more AC signals applied to the sample can be swept in frequency either upwards or downwards until the amplitude of the difference frequency signal is optimized in one of a variety of ways as described herein.

BRIEF DESCRIPTION OF THE FIGURES

FIG. 1 is a partly schematic and partly cross-sectional view of a portion of an ACSTM and a positioning mechanism for positioning a sample relative to the probe tip of the ACSTM to illustrate the invention.

FIG. 2A is a block diagram of the ACSTM of FIG. 1 illustrating an embodiment of the invention that detects at a difference frequency to illustrate an embodiment of the invention.

FIG. 2B is a block diagram of a portion of the ACSTM of FIG. 2A illustrating a mechanism for causing relative motions between the probe tip and the sample so that the sample may be scanned to provide a profile of dopants or other atomic characteristics of the sample to illustrate an embodiment of the invention.

FIGS. 3A, 3B are graphical plots of difference frequency signal amplitudes for p- and n-type doped silicon as a function of fundamental modulation frequencies and DC bias values to illustrate the invention.

FIG. 4A is a graphical plot of model capacitance curves of a metal-insulator-semiconductor structure for both p- and n-type semiconductors to illustrate the invention.

FIG. 4B is a graphical plot of dC/dV curves corresponding to those in FIG. 4A, determined numerically based on the capacitance curves in FIG. 4A to illustrate the invention.

FIGS. 5A–5D are difference frequency signal images of a phosphorus-doped silicon substrate with boron implant stripes at various DC biases to illustrate the invention.

FIG. 6 is a difference frequency signal image of a p-type silicon substrate doped with stripes of boron to illustrate the invention.

FIG. 7 is a graphical plot of the relationship between difference frequency signal amplitude and resistivity of doped semiconductor materials, showing that difference frequency signal amplitude varies directly and monotonically with resistivity of doped semiconductor materials.

FIG. 8A is a topograhical image of a doped semiconductor sample, and FIG. 8B is a profile of the sample obtained using the invention of the difference frequency signal amplitude.

For simplicity in description, identical components are identified by the same numerals in this application.

DETAILED DESCRIPTION OF THE PREFERRED EMBODIMENTS

To address these and related issues, the applicants have developed a novel dopant profiling tool based on the alternating current scanning tunneling microscope (ACSTM). The STM is a well-established surface probe that is routinely capable of spatial resolution on the atomic scale. The applicants' goal has been to incorporate the unparalleled imaging capability of the STM with an accurate dopant profiling system. The instrument is based on a custom-built alternating current scanning tunneling microscope (ACSTM), such as those described in: S. J. Stranick and P. S. Weiss, Rev. Sci. Instrum., 64, 1232 (1993); S. J. Stranick and P S. Weiss, Rev. Sci. Instrum., 65, 918 (1994) and L. A. Bumm and P. S. Weiss, Rev. Sci. Instrum., 66, 4140 (1995).

The instrument was adapted in several ways to facilitate dopant profiling. The ability to position the sample in three dimensions with sub-micron resolution is desirable to locate devices on or beneath a surface, so that they can be imaged with the ACSTM. In order to accomplish this, a beetle-style microscope was designed and built (shown schematically in FIG. 1). The new ACSTM was based on the design of previous ACTSMs, described in the three references above by Stranick and Bumm et al. It was built to have a relatively large scan range, approximately 15 microns, increasing the area that can be investigated during a single image by over two orders of magnitude compared to earlier ACSTM designs. A similar design is described in U.S. Pat. No. 5,559,328, which is incorporated herein in its entirety by reference.

The instrument is also equipped with a fiber or electron microscope 12 that allows optical access to or other ability to image the sample 50. Three fine-threaded adjustment screws 14 enable coarse lateral adjustment of the sample. Prior to tunneling, the tip-sample junction is coarsely aligned to the region of interest with the assistance of the fiber or electron microscope and the three adjustment screws. The beetle-style ACSTM is equipped with three piezoelectric tube scanners (walker legs) 16 that allow fine adjustment of the tip-sample junction. Each walker leg is patterned with four outer quadrant electrodes and an inner electrode. By individually addressing these quadrants, fine adjustments can be made in the sample position. Other coarse approach and maneuvering mechanisms will also work for this location and are included within the scope of this invention.

The instrument is tunable over a wide frequency range and has the ability to introduce up to three or more frequencies to the tunneling junction simultaneously. The manner by which an AC signal of multiple frequencies may be formed and applied in ACSTM is described in U.S. Pat. No. 5,581,193, which is incorporated herein in its entirety by reference. The instrument detection system is capable of detecting transmitted and reflected, fundamental and nonlinear alternating current signals, and can determine phase as well as magnitude information. Details of such capability are described in U.S. Pat. Nos. 5,268,573 and 5,281,814, which are incorporated herein in their entireties by reference. This allows us local access to the frequency dependence, energy, and position of electronic responses of doped semiconductors. Introducing multiple frequencies to the STM probe tip allows us to generate a difference frequency signal that is produced due to the nonlinear nature of the STM tunnel junction. The applicants have already used this method to probe the electronic properties of self-assembled monolayers and single molecules. The present invention extends the technique to semiconductor dopant profiling.

As shown below, the nonlinear AC signal is sensitive to dopant type and density, giving us a convenient means to integrate a dopant profiling system with the high-resolution STM. In this application, the applicants first characterize the frequency and voltage response of the technique, and then use it to image patterns on doped semiconductor substrates to determine both dopant density and dopant type.

Data acquisition was accomplished using a difference frequency mixing strategy. A schematic of the instrument configuration 20 is shown in FIGS. 2A, 2B. In addition to the conventional DC bias applied to the tunnel junction through tip 22 by means of an adjustable DC source 24, AC signals at two frequencies $\omega_1$ and $\omega_2$ are introduced from a tunable waveform generator 30 that includes sources 32, 34 providing AC signals at two frequencies $\omega_1$ and $\omega_2$ respectively. An external reference 36 provides a reference carrier frequency. The two sources modulate such carrier signal at two frequencies $\omega_1$ and $\omega_2$ to provide two AC signals, and combiner 38 combines the two AC signals from the sources. The modulation frequencies $\omega_1$ and $\omega_2$ are offset by a small amount (typically 5 kHz) that becomes the detected frequency ($\omega_1-\omega_2=\Delta\omega$). The mixing product ($\Delta\omega$) occurs at low frequency, so it is conveniently extracted and detected using a lock-in amplifier 40. Other test equipment such as network analyzers, spectrum analyzers, and bandpass filters can be used for detection instead of a lock-in amplifier and are included within the scope of this invention. A reference signal $\Delta\omega_{ref}$ for the lock-in is created by splitting off a portion of the applied AC signals prior to the tunnel junction in a directional coupler 42, and sending them through a diode 44 to generate the desired difference frequency. Many other possible nonlinear elements 44 can be used for this purpose and are included within the scope of this invention. The applied AC signals containing the two modulation frequencies $\omega_1$ and $\omega_2$ are coupled to the tip 22 by means of bias tee 46. Other means of coupling AC and DC signals are possible, and are included within the scope of this invention. Where the AC signal applied contains components of three or more frequencies, the lock-in amplifier may be set to amplify at a difference frequency substantially equal to the difference between the frequencies of any pair of frequency components in the signal, or an integer multiple thereof. More than one lock-in amplifier or other detector may also be employed to detect at more than one difference frequency; such and other variations are within the scope of the invention.

Thus, two frequencies, $\omega_1$ and $\omega_2$ are generated and combined by combiner 38. A portion of the mixed signal is sent through a non-linear element such as a diode 44, which creates the nonlinear difference frequency reference signal, $\Delta\omega_{ref}$ for the lock-in amplifier or other detector. The remainder of the mixed signal is combined with the DC bias voltage and sent to the STM tip 22. The nonlinear nature of the STM tunnel junction and of the sample creates the difference frequency signal, $\Delta\omega_{signal}$. This is extracted from the tunnel current and sent to the lock-in amplifier or other detector for comparison with $\Delta\omega_{ref}$.

The sources 32, 34 are tunable, so that the two frequencies $\omega_1$ and $\omega_2$ may be swept from 0 to about 20 GHz or higher, or from a high to low frequency (e.g. 20–0 GHz). Each of the sources may comprise, for example, a microwave oscillator controlled by an analyzer, to tune the frequency of its output. The tuning of the frequencies $\omega_1$ and $\omega_2$, and detection by amplifier 40, may be controlled by computer 54. Alternatively, where it is not necessary to find optimum values of the two frequencies $\omega_1$ and $\omega_2$, or where this has already been accomplished, sources 32, 34 could be fixed frequencies sources, or be operated at fixed frequencies.

The tip-sample distance is precisely controlled using the DC tunneling current for feedback from amplifier 48, preventing the metal tip from contacting the semiconductor substrate 50. Such distance is controlled by means of control electronics 52 under the control of computer 54. Using the tunneling current for controlling the tip-sample distance, it is possible to maintain a smaller, more stable separation between tip and sample. This ultimately yields higher resolution than techniques such as scanning capacitance microscopy. It is also possible to use the force exerted on the tip 22 by the sample 50 for controlling the tip-sample distance in an arrangement often used in atomic force microscopy. One example of such tip-sample distance control is described in the article by J. Schmidt et al. referenced above. This alternative method of tip-sample distance control enables a wider range of materials to be probed.

This tip-air-semiconductor or tip-vacuum-semiconductor arrangement resembles a metal-insulator-semiconductor (MIS) structure. Also, the semiconductor surface is often passivated with a thin insulating layer (oxide or other). Signals resulting from an MIS structure will consist of both capacitive C(V) and conductive G(V) terms. C(V) originates from the capacitances of the air (or vacuum) gap and semiconductor depletion layer. Thus, the application of a positive electrical potential to tip 22 attracts more electrons towards the surface of substrate 50, thereby increasing the capacitance C(V). G(V) describes losses in the AC signal from effects such as the STM tunneling current, series resistance in the semiconductor substrate, and sample and tip local density of states.

The difference frequency detection strategy makes use of the capacitive characteristics of the doped semiconductor, which vary according to dopant density and type. Additionally, it allows us to tune the instrument over a range of fundamental frequencies, in a range of about 0–20 GHz, while the output signal detected by amplifier 40 remains at a constant frequency. One expects the difference frequency signal to be analogous to the sum frequency signal, and be proportional to dC/dV. The capacitive part of the AC output signal i at frequency $\omega$ can be written in the form of a Taylor series expansion:

$$i = j\omega\left(C(V_0) + \left.\frac{\delta C}{\delta V}\right|_{V_0} v + \frac{1}{2}\left.\frac{\delta^2 C}{\delta V^2}\right|_{V_0} v^2 + \ldots\right)v, \quad 1)$$

where $V_0$ is the dc bias voltage, C(V) is the capacitance, V the voltage applied and $v=v\exp(j\omega t)$ t), where t is time. For two ac input signals, $v_1=V\cos(\omega_1 t)$ and $v_2=V\cos(\omega_2 t)$, Eq. (1) can be expanded to yield the component of the difference frequency ($\omega_1-\omega_2$) as part of the total output current, $i_{tot}$:

$$i_{tot} = \ldots + \frac{1}{2}\left.\frac{\delta C}{\delta V}\right|_{V_0}(\omega_1-\omega_2)V^2\cos([\omega_1-\omega_2]t)\ldots \quad 2)$$

Eq. (2) shows that the difference frequency is proportional to the first derivative of the capacitance. Because the capacitive characteristics of n- and p-type Si are different, the difference frequency should provide an effective contrast mechanism for profiling dopants. A more complete discussion of mixing signals and characteristics of doped Si can be found in Schmidt et al. referenced above and *High Resolution Dopant Profiling Using a Tunable AC Scanning Tunneling Microscope*, G. S. McCarty, Z. J. Donhauser, L. A. Bumm, and P. S. Weiss, *Characterization and Metrology for ULSI Technology: 2000 International Conference*, D. G. Seiler, A. C. Diebold, T. J. Shaffner, R. McDonald, W. M. Bullis, P. J. Smith, and E. M. Secula, editors (American Institute of Physics, New York, 2001), 641.

For the initial characterization experiments on uniformly doped Si, the applicants purchased p- and n-type silicon samples from Virginia Semiconductors, Inc, Fredericksburg Va. 22401. Samples were prepared by annealing at 950° C. for one hour, and then the surfaces were cleaned with a 1:1 $H_2O_2$:HCl solution.

To fabricate patterned substrates, the applicants photolithographically prepared a stripe pattern with a 2 $\mu$m pitch. Both boron-doped p-type and phosphorus-doped n-type bulk silicon with concentrations of $1\times10^{15}$ cm$^{-3}$ were used as the base substrates. The applicants implanted both n- and p-type bulk substrates with boron doses ranging from $1\times10^{11}$ cm$^{-2}$ to $2\times10^{14}$ cm$^{-2}$ or phosphorus doses ranging from $1\times10^{11}$ cm$^{-2}$ to $3\times10^{14}$ cm$^{-2}$. All boron implants were done at 35 keV and all phosphorus implants were done at 50 keV. The samples discussed below are bulk n-type Si doped with a $1\times10^{11}$ cm$^{-2}$ dose of boron, and bulk p-type Si doped with a $2\times10^{13}$ cm$^{-2}$ dose of boron. The final samples consisted of implanted 0.5 $\mu$m stripes spaced by 1.5 $\mu$m of unimplanted substrate. The applicants then activated all implants by rapid thermal annealing at 1040° C. for 40 seconds.

Immediately prior to all measurements with the ACSTM, the applicants dipped the test samples in a 48% HF solution for ~2 minutes to remove the surface oxide. The experiments were performed in a custom-built tunable ACSTM, which has been previously described (9–11,16). All measurements were carried out at ambient temperatures and pressures.

The cleaned, doped Si substrates were used to map out the frequency and voltage response as a function of dopant type and concentration. In FIGS. 3A, 3B, the magnitude of the difference frequency signal is plotted as a function of applied frequency and voltage, for both p- and n-type Si. The difference frequency signal is strongly dependent on the fundamental frequency.

FIG. 3A is a graphical plot of difference frequency signal magnitude for Si(100) as a function of fundamental modulation frequency and DC bias for 0.001 ohm-cm boron-doped silicon. A wide peak is centered at –0.7 V sample bias.

FIG. 3B is a graphical plot of difference frequency signal magnitude for Si(100) as a function of fundamental modulation frequency and DC bias for 1–3 ohm-cm phosphorus-doped silicon. FIG. 3B shows data for lightly doped n-type Si (1–3 Ω-cm phosphorous-doped). The peak for phosphorous doping occurs close to 0 V bias. For both n- and p-type Si, relatively low applied frequencies provide the largest signals. This can be attributed to attenuation of high frequency signals through the transmission lines leading into the ACSTM. Reflections of the high frequency signals can occur at transmission line connectors and in coupling to the STM tip. This results in further loss at high frequency, and less signal generated in the tunnel junction for frequencies greater than several hundred MHz. Fortunately, a large nonlinear effect is seen at low frequencies providing the difference frequency signal necessary for semiconductor characterization. It is important to note that the data displayed in this figure is the magnitude of the difference frequency signal; all phase information has been neglected. Because changes in tip size and shape as well as the precise sample orientation can affect the phase of the difference frequency signal, between the n- and p-type Si it can be difficult to compare phase information. As described below, a phase difference when n- and p-type Si are compared on the same substrate is expected.

FIG. 4A is a graphical plot of model capacitance curves of a metal-insulator-semiconductor structure for both a p- and an n-type semiconductor to illustrate the invention. FIG. 4B is a graphical plot of corresponding dC/dV curves to those in FIG. 4A, determined numerically based on the capacitance curves in FIG. 4A.

If one considers the ACSTM tip-gap-semiconductor as a MIS structure, the precise shape and magnitude of these curves would be determined by a variety of factors, including the dopant concentration, the distance of the tip from the sample (the insulator thickness), the magnitude of the tunneling current, and the probe tip geometry. Although they only model the system of the invention of this application, the curves in FIGS. 4A, 4B may be used to understand qualitatively the difference frequency signal observed in images at different biases. Because one expects the magnitude and phase of the signal to be related to the differential capacitance, one expects that the largest signals would occur at bias voltages near 0 volts, as illustrated in FIGS. 4A, 4B, and that the signal would decrease as the magnitude of the bias increases. Additionally, one expects an 180° relative phase shift between n- and p-type regions on the semiconductor surface, as illustrated in FIG. 4B. Voltage offsets can occur from the specific surface treatment, band bending, and other effects. While the tunable ACSTM system is significantly more complicated than a simple fixed-geometry MIS capacitor, the dC/dV model is a first-order approximation for the contrast observed in difference frequency images obtained at different bias voltages. Thus, the difference frequency signal signature as shown in FIG. 4B may be used to compare with that obtained from a sample with unknown dopant type to determine the type (e.g. n- or p-) of dopants in the sample.

A series of bias dependent images demonstrate the trends described above. FIGS. 5A–5D are difference frequency images of an n-type substrate doped with boron. The sample was prepared to have 0.5 $\mu$m p-type (with a nominal concentration of $10^{15}$ cm$^{-3}$) stripes, with a background of 1.5 $\mu$m n-type stripes ($10^{15}$ cm$^{-3}$). After locating the pattern, difference frequency images were acquired at voltages ranging from –1.5 V to +1.5 V. There is a strong bias dependence observed in the difference frequency images. Between all of the images, the largest signals are seen at +0.5 V and –0.5 V. This is expected for values near zero, based on the model differential capacitance curves. The stripe feature is still evident at higher bias voltages, but the magnitude of the difference frequency signal has greatly diminished. The expected 180° phase shift between n- and p-type silicon is observed in the images acquired at high voltage, confirming the assignment of the different regions. FIGS. 5A–5D are 1.2 $\mu$m×1.2 $\mu$m difference frequency images of a 1×$10^{15}$ cm$^{-3}$ boron implant stripe in a 1×$10^{15}$ cm$^{-3}$ phosphorus-doped Si(100) substrate at varying biases. The implant stripes were defined photolithographically to have a width of 0.5 $\mu$m. Corresponding topographic images are inset. The vertical bars indicate signal magnitude. The applicants have also demonstrated the ability of the ACSTM to distinguish between areas of differing dopant concentration for the same dopant type.

FIG. 6 is a 1.2 $\mu$m×1.2 $\mu$m difference frequency image of a $10^{15}$ cm$^{-3}$ p-type Si(100) substrate nominally doped with stripes of $10^{18}$ cm$^{-3}$ boron. Again, the area of higher concentration was implanted as 0.5 $\mu$m wide stripes with a pitch of 2 $\mu$m defined photolithographically. The corresponding topographic image is inset. In this case, the stripe feature is completely absent from the inset topographic image, yet shows up clearly in the corresponding difference frequency image. From these and related results, one ascertains that the magnitude of the difference frequency signal depends strongly on the local dopant density, and not solely on dopant type. The results also demonstrate the ability of the ACSTM to differentiate between areas of high and low concentration of the same dopant type using difference frequency detection. This capability is important for imaging patterned substrates and devices.

From FIGS. 3A, 3B, and 4B, it is evident that the difference signal frequency amplitude depends on the DC bias applied. As noted above, even though the difference signal frequency amplitude is expected to be maximum at around zero volts DC sample bias, this may not be the case; in FIG. 3A, for example, such amplitude is maximum at about –0.7 volts. Therefore, for optimal results, it is desirable to vary the DC sample bias applied by source 24 until the difference signal frequency amplitude or the contrast between doped regions is optimal. For some applications, this may mean that the DC voltage should be varied until the difference signal frequency amplitude is maximum. For other applications, such as where it is desirable to find the location of a p-n junction, for example, the maximum contrast between the difference signal frequency amplitude detected in the p-region as opposed to that detected in the n-region is of greater interest. For this purpose, the DC bias of source 24 may be varied until such contrast is maximized, such as by maximizing the difference between the amplitude of the difference frequency signal detected at the n-region and that detected at the p-region. Patterns may be mapped optimally by comparing difference frequency images recorded at two or more DC sample biases. This and related comparisons of multiple images are within the scope of the invention.

Instead of detecting at a difference frequency, the lock-in amplifier 40 or other type of detector may be set to detect a multiple (such as an integral multiple) of the difference between the frequencies of two signal components in the AC signal applied to the tip 22 during the above-described optimization process and subsequent measurement process.

As is also evident from FIGS. 3A, 3B, the magnitude of the difference frequency signal also depends strongly on the fundamental modulation frequencies applied by AC signal sources such as sources 32 and 34 to modulate the reference frequency of the external reference 36. Thus, under the control of computer 54 (connection not shown in FIG. 2A), the modulation frequencies applied by sources 32, 34 may also be varied to optimize the magnitude of the difference frequency signals detected by the amplifier 40 or the magnitude at a frequency equal to a multiple of the difference frequency. During such process, computer 54 preferably controls the sources, such as 32, 34, so that modulation frequencies are increased or decreased by substantially the same amount, thereby allowing the lock-in amplifier 40 to detect at a constant difference frequency or a multiple thereof. This permits system 20 to determine the optimal modulation frequencies that should be generated by the sources, such as sources 32, 34, so that the magnitude of the difference frequency (or an integer multiple thereof) signal is optimized.

FIG. 2A is a block diagram illustrating a portion of system 20 of FIG. 2A where a moving stage 60 supports sample 50 and is used to cause relative motion between sample 50 and the STM tip 22 in a plane (such as horizontal XY plane) that is substantially perpendicular to the direction of movement (such as in a vertical Z direction) of tip 22, so that tip 22 can be caused to scan over an area in the plane of sample 50. This permits dopant profiles such as those shown in FIGS. 5A–5D and 6 to be generated.

From experiments performed, the applicants found that where semiconductors are doped by the same dopants but to different dosages, densities or concentrations, that at the DC sample biases most commonly employed, the lightly doped regions of the sample would cause a higher magnitude difference frequency signal than an area doped at a higher concentration, and that the magnitude of the difference frequency signal depends strongly and monotonically on the dopant density or concentration. This is illustrated in FIG. 7. Thus, since the resistivity of a doped semiconductor varies inversely and monotonically with dopant density, from FIG. 7 it is evident that the difference frequency signal amplitude also varies inversely and monotonically with dopant density. This allows actual dopant density or concentration to be determined using a reference, such as a reference database.

Thus, reference samples with known dopant dosages, densities or concentrations may be measured using system 20 of FIGS. 2A, 2B to provide reference data, such as in the form of graphs of the type shown in FIG. 7. This may be repeated with different dopants (e.g. boron, phosphorus, etc.) at different dopant densities to compile different sets of reference data. Then when it is desirable to determine the dopant density of a particular sample, first the dopant type is determined. Thus, n- and p-dopant types may be differentiated by measuring the change in the difference signal frequency as the DC bias is varied, as illustrated in FIG. 4B. The particular dopant (such as boron or phosphorus) may be determined by comparison to the different sets of reference data obtained. The dopant dosages, densities or concentrations may then be obtained by comparison of the difference frequency signal measured, in some cases as a function of DC sample bias voltage, or at one or more DC sample bias voltages, compared to the reference data measured from samples of known dosages, densities or concentrations of the same dopant. Where the reference data are obtained from reference samples of known dopant densities in the form of graphs shown in FIG. 7, a comparison of the difference frequency signal amplitude measured with the reference graph will yield the resistivity of the sample measured. The dopant density can then be obtained from such resistivity by calculation, or by referring to available data relating dopant density to resistivity of doped semiconductor materials.

As shown in FIG. 2A, the difference frequency signal measured by amplifier 40 is supplied to computer 54 for compiling the reference data sets and for performing the comparison between data measured from a sample of a known dopant or dopant concentration to reference data stored in computer 54. Computer 54, in turn, controls lock-in amplifier 40 so that amplifier would detect at a difference frequency or a multiple thereof.

Where it is desirable to provide an image of a sample substrate doped in various regions, a difference frequency image of the sample may be adequate to determine the locations of the doped regions, such as illustrated in FIGS. 5A, 5B and 6.

FIG. 8A is a topograhical image of a doped semiconductor sample, and FIG. 8B is a profile of the sample obtained using the invention of the difference frequency signal amplitude. As is evident from a comparison of FIGS. 8A, 8B, the invention is capable of measuring single atomic vacancies that function as dopants.

While the invention has been described above by reference to various embodiments, it will be understood that changes and modifications may be made without departing from the scope of the invention, which is to be defined only by the appended claims and their equivalent. All references referred to herein are incorporated by reference in their entireties.

What is claimed is:

1. A method for measuring dopants in semiconductors, comprising:
    applying an AC electrical signal to a semiconductor sample, said signal including at least two frequency components;
    detecting a signal at the sample at a detection frequency substantially equal to the frequency difference between the at least two frequency components or a multiple thereof; and
    processing the signal detected to measure dopants in the sample.

2. The method of claim 1, further comprising applying a DC bias voltage across an electrode and the sample.

3. The method of claim 2, further comprising altering amplitude of the DC bias voltage until the signal detected is optimized.

4. The method of claim 3, wherein amplitude of the DC bias voltage is altered until the signal detected is maximized in amplitude.

5. The method of claim 3, wherein amplitude of the DC bias voltage is altered until contrast between signals detected at said detection frequency as a result of dopants having two different responses to the AC signal in the sample is maximized.

6. The method of claim 1, wherein the processing distinguishes between p and n type dopants.

7. The method of claim 6, wherein the applying applies the AC signal by means of an electrode, said method further comprising applying a DC bias voltage across the electrode and the sample, and altering amplitude of the DC bias voltage until the signal detected is optimized so that said detecting detects the signal at said detection frequency when the signal detected is optimized.

8. The method of claim 1, wherein the applying applies the AC signal by means of an electrode, said method further comprising scanning the electrode across a surface of the sample wherein the processing provides a dopant profile of the sample.

9. The method of claim 8, said method further comprising applying a DC bias voltage across the electrode and the sample, and altering amplitude of the DC bias voltage until the signal detected is optimized so that said detecting detects the signal at said detection frequency when the signal detected is optimized.

10. The method of claim 8, wherein the processing compares the detected signal to reference data to determine a profile of type of dopants or a profile of dosage or density of dopants in the sample.

11. The method of claim 10, further comprising measuring samples with known dosage or density of dopants to obtain the reference data.

12. The method of claim 8, wherein said applying applies the AC signal by means of a tip of the electrode placed adjacent to the sample, and the scanning scans the tip cross the surface of the sample.

13. The method of claim 1, wherein the processing compares the detected signal to reference data to determine dosage or a parameter related to density of dopants in the sample.

14. The method of claim 13, further comprising measuring samples with known dosage or density of dopants to obtain the reference data.

15. The method of claim 1, wherein said applying applies the signal so that frequencies of said at least two frequency components change.

16. The method of claim 15, wherein said applying applies the signal so that frequencies of said at least two frequency components increase or decrease by substantially the same amount when said detecting detects at said detection frequency.

17. An apparatus for measuring dopants in semiconductors, comprising:

a source supplying an AC electrical signal to a semiconductor sample, said signal including at least two frequency components;

a detector detecting a signal at the sample at a detection frequency substantially equal to the frequency difference between the at least two frequency components or a multiple thereof; and a processor processing the signal detected using predicted or reference data for dopants to measure dopants in the sample.

18. The apparatus of claim 17, further comprising a database containing reference data on dopants.

19. The apparatus of claim 17, wherein the processor compares the signal detected to predicted data to distinguish between p and n type dopants.

20. The apparatus of claim 17, further comprising an electrode, wherein the source applying applies the AC signal by means of an electrode, said apparatus further comprising an instrument causing relative motion between the electrode and the sample, so that the electrode passes across a surface of the sample wherein the processor provides a dopant profile of the sample.

21. The apparatus of claim 20, wherein the processing compares the detected signal to reference data to determine a profile of type of dopants or a profile of dosage or density of dopants in the sample.

22. The apparatus of claim 20, wherein said electrode comprises a tip, and the source applies the AC signal by means of the tip of the electrode placed adjacent to the sample, and the instrument scans the tip across the surface of the sample.

23. The apparatus of claim 17, further comprising a database containing reference data on dopants, wherein the processor compares the detected signal to the reference data to determine dosage or density of dopants in the sample.

24. The apparatus of claim 17, further comprising an electrode, wherein the source applies the AC signal by means of an electrode, said apparatus further comprising an instrument aligning the sample with the electrode.

25. The apparatus of claim 24, said instrument comprising an optical and/or electron microscope providing a signal to the sample and adjustment screws for lateral positioning of the sample relative to the electrode.

26. The apparatus of claim 17, further comprising an electrode, wherein the source applying applies the AC signal by means of an electrode, said apparatus further comprising a second source applying a DC bias voltage across the electrode and the sample.

27. The apparatus of claim 26, wherein said second source is tunable to apply a DC bias voltage of variable amplitude to optimize the signal detected.

28. The apparatus of claim 17, wherein said source is tunable so that frequencies of said at least two frequency components are increased or decreased by substantially the same amount when said detector detects at said detection frequency.

* * * * *